(12) United States Patent
Armstrong et al.

(10) Patent No.: US 9,092,297 B2
(45) Date of Patent: *Jul. 28, 2015

(54) TRANSPARENT UPDATE OF ADAPTER FIRMWARE FOR SELF-VIRTUALIZING INPUT/OUTPUT DEVICE

(71) Applicant: International Business Machines Corporation, Armonk, NY (US)

(72) Inventors: William J. Armstrong, Rochester, MN (US); Charles S. Graham, Rochester, MN (US); Andrew T. Koch, Rochester, MN (US); Kyle A. Lucke, Oronoco, MN (US); Naresh Nayer, Rochester, MN (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/796,111

(22) Filed: Mar. 12, 2013

(65) Prior Publication Data

US 2013/0191821 A1 Jul. 25, 2013

Related U.S. Application Data

(63) Continuation of application No. 13/004,087, filed on Jan. 11, 2011, now Pat. No. 8,418,166.

(51) Int. Cl.
| | |
|---|---|
| G06F 9/44 | (2006.01) |
| G06F 9/445 | (2006.01) |
| G06F 11/20 | (2006.01) |
| G06F 9/455 | (2006.01) |
| G06F 11/14 | (2006.01) |

(52) U.S. Cl.
CPC .............. *G06F 8/65* (2013.01); *G06F 9/4411* (2013.01); *G06F 9/45558* (2013.01); *G06F 11/20* (2013.01); *G06F 11/1484* (2013.01); *G06F 2009/45579* (2013.01); *G06F 2201/815* (2013.01)

(58) Field of Classification Search
None
See application file for complete search history.

(56) References Cited

U.S. PATENT DOCUMENTS

| | | |
|---|---|---|
| 7,823,020 B2 | 10/2010 | Bishop et al. |
| 7,904,895 B1 | 3/2011 | Cassapakis et al. |
| 8,010,763 B2 | 8/2011 | Armstrong et al. |
| 8,176,487 B2 | 5/2012 | Armstrong et al. |
| 8,201,161 B2 | 6/2012 | Challener et al. |
| 8,219,988 B2 | 7/2012 | Armstrong et al. |
| 8,219,989 B2 | 7/2012 | Armstrong et al. |

(Continued)

*Primary Examiner* — Don Wong
*Assistant Examiner* — Daxin Wu
(74) *Attorney, Agent, or Firm* — Wood, Herron & Evans, L.L.P.

(57) ABSTRACT

A firmware update process for a self-virtualizing IO resource such as an SRIOV adapter is incorporated into a platform firmware update process to systematically update the resource firmware in a manner that is for the most part transparent to the logical partitions sharing the adapter. In particular, resource firmware associated with a self-virtualizing IO resource is bundled with firmware for at least one adjunct partition associated with that self-virtualizing IO resource within a common firmware image so that, upon restart of the adjunct partition to use the updated firmware image, the resource firmware is also updated, with a logical partition that uses the self-virtualizing IO resource maintained in an active state during the restart, and without requiring the self-virtualizing IO resource to be deconfigured from the logical partition.

25 Claims, 10 Drawing Sheets

(56) References Cited

U.S. PATENT DOCUMENTS

| | | |
|---|---|---|
| 8,561,066 B2 * | 10/2013 | Koch et al. .................. 718/1 |
| 8,645,965 B2 * | 2/2014 | Zimmer et al. .............. 718/104 |
| 2004/0205776 A1 | 10/2004 | Harrington et al. |
| 2004/0205779 A1 * | 10/2004 | Almeida et al. ............. 719/321 |
| 2004/0210890 A1 | 10/2004 | Armstrong et al. |
| 2006/0064523 A1 | 3/2006 | Moriki et al. |
| 2007/0220246 A1 | 9/2007 | Powell et al. |
| 2009/0037941 A1 | 2/2009 | Armstrong et al. |
| 2009/0248937 A1 | 10/2009 | Solomon et al. |
| 2009/0276773 A1 | 11/2009 | Brown et al. |
| 2009/0313391 A1 | 12/2009 | Watanabe |
| 2010/0014526 A1 | 1/2010 | Chavan et al. |
| 2010/0082874 A1 | 4/2010 | Baba et al. |
| 2010/0095310 A1 | 4/2010 | Oshins |
| 2010/0180274 A1 | 7/2010 | Cherian et al. |
| 2012/0117365 A1 * | 5/2012 | Navy et al. ................... 713/2 |
| 2012/0117555 A1 * | 5/2012 | Banerjee et al. ............. 717/168 |

* cited by examiner

TRANSPARENT UPDATE OF ADAPTER FIRMWARE FOR SELF-VIRTUALIZING INPUT/OUTPUT DEVICE

CROSS-REFERENCE TO RELATED APPLICATIONS

This application is a continuation of U.S. patent application Ser. No. 13/004,087, filed on Jan. 11, 2011 by William J. Armstrong et al. (now issued as U.S. Pat. No. 8,418,166), the entire disclosure of which is incorporated by reference herein.

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, traditional maintenance or upgrade of adapter firmware typically requires removing the adapter from the operating system (OS) configuration by either deconfiguring or unconfiguring the adapter or rebooting the platform with a maintenance utility, manually updating the adapter firmware using an update utility, and then adding the adapter back in the OS configuration. Given, however, that self-virtualizing IO resources such as SRIOV adapters are typically shared by multiple operating systems or LPARs on a system platform, the effort and coordination required to update SRIOV adapter firmware are significantly increased, as there are multiple LPARs involved, as well as the hypervisor or other virtual machine manager. Furthermore, given the desirability of maximizing system uptime and minimizing disruptions in service, traditional adapter firmware update processes typically cause too much service interruption, often requiring interruptions, and potentially restarts, of LPARs as well as the underlying hypervisor and other system firmware.

A need therefore exists in the art for a manner of minimizing the impact of a firmware update for the resource firmware for a self-virtualizing IO resource in a logically partitioned computer.

SUMMARY OF THE INVENTION

The invention addresses these and other problems associated with the prior art by providing a firmware update process for a self-virtualizing IO resource such as an SRIOV adapter that is incorporated into a platform firmware update process to systematically update the resource firmware in a manner that is for the most part transparent to the logical partitions sharing the adapter. In particular, resource firmware associated with a self-virtualizing IO resource is bundled with firmware for at least one adjunct partition associated with that self-virtualizing IO resource within a common firmware image so that, upon restart of the adjunct partition to use the updated firmware image, the resource firmware is also updated, with a logical partition that uses the self-virtualizing IO resource maintained in an active state during the restart, and without requiring the self-virtualizing IO resource to be deconfigured from the logical partition.

Therefore, consistent with one aspect of the invention, firmware associated with a self-virtualizing input/output (IO) resource in a logically partitioned data processing system is updated by updating at least one firmware image that includes updated resource firmware associated with the self-virtualizing IO resource and adjunct partition firmware associated with an adjunct partition for the self-virtualizing IO resource, restarting the adjunct partition such that the adjunct partition executes the updated firmware image, and, during restarting of the adjunct partition, maintaining a logical partition that uses the self-virtualizing IO resource in an active state and without deconfiguring the self-virtualizing IO resource from the logical partition.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
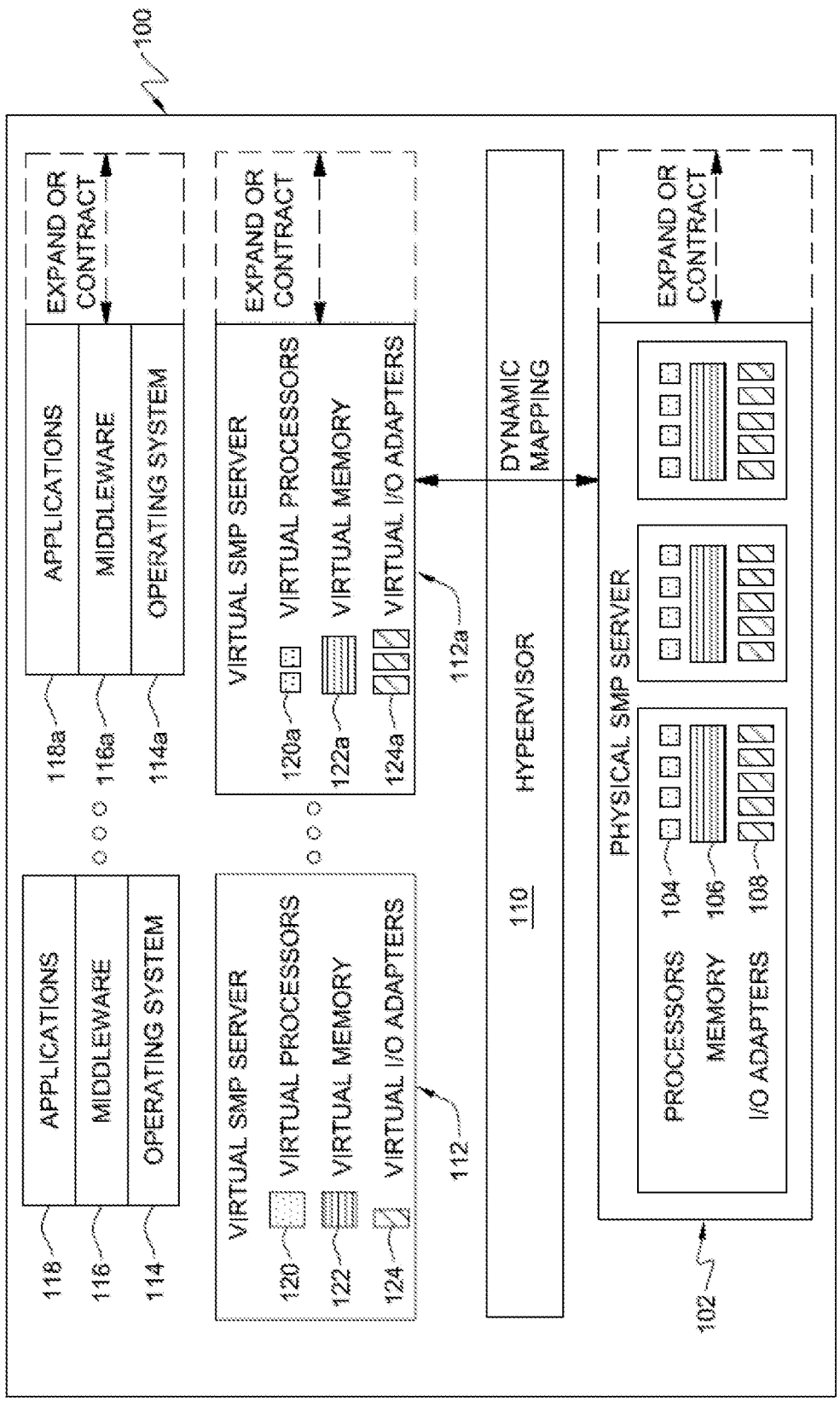
FIG. 1 is a block diagram of one embodiment of a data processing system configured to implement one or more aspects of the present invention.

Embodiments consistent with the invention implement a firmware update process for a self-virtualizing IO resource such as an SRIOV adapter that is incorporated into a platform firmware update process for a logically partitioned data processing system to enable the resource firmware to be updated in a manner that is for the most part transparent to the logical partitions sharing the adapter.

In embodiments consistent with the invention, firmware associated with a self-virtualizing IO resource is bundled together with firmware for at least one adjunct partition associated with that self-virtualizing IO resource into a common firmware image. Therefore, upon restart of the adjunct partition to use the updated firmware image, the resource firmware is also effectively updated. Moreover, during this process, any logical partition that uses the self-virtualizing IO resource may be maintained in an active state during the restart, and typically without requiring the self-virtualizing IO resource to be unconfigured or deconfigured from the logical partition. A firmware update may be performed, for example, as part of a service pack or similar minor fix (e.g., a program temporary fix) of the firmware, or as part of a relatively more disruptive platform firmware update.

A firmware image, within the context of the invention, refers to any unit, module, or other collection of firmware program code that is capable of being updated in a logically partitioned data processing system. Typically, a firmware image represents the smallest or most basic unit or binary image that can be loaded, and may include program code for various program entities resident in the firmware, e.g., the hypervisor, adjunct partitions, resource-related firmware, partition-related firmware, etc. Of note, the updated resource firmware may be included in a firmware image with updated or non-updated adjunct partition firmware, whereby in the latter case only the resource firmware is being updated.

By incorporating resource firmware for a self-virtualizing IO resource, e.g., a virtual function and/or physical function device driver for the resource, within a firmware image along with firmware for an adjunct partition associated with the resource, the update of the resource firmware may be performed in much the same manner as other platform firmware updates in a logically partitioned data processing system, and often with minimal interruption in system availability. In particular, with respect to a self-virtualizing IO resource, it is desirable to perform the update in such a manner that any logical partition that uses the self-virtualizing IO resource will be maintained in an active state, and without the self-virtualizing IO resource having to be unconfigured or deconfigured from the logical partition. In the illustrated embodiments, this is implemented by presenting the self-virtualizing IO resource as experiencing a temporary outage, e.g., a temporary loss of network connectivity, during restarting of the adjunct partition. In embodiments that utilize a vendor-independent virtual network partition interface between a logical partition and an adjunct partition, this temporary outage can be detected and handled in a vendor-independent client virtual network partition interface device driver resident in the logical partition, and may be similar, for example, to the manner in which temporary outages due to EEH handling are handled in such a device driver. As such, restoration of network connectivity or otherwise the termination of the temporary outage may result in automatic restoration of connectivity to the self-virtualizing IO resource in the logical partition upon completion of a restart to the adjunct partition(s) through which the logical partition is interfaced to the resource. In addition, in some embodiments, where automated failover to backup resources is supported, detection of a temporary outage in a logical partition may result in an automatic failover to a backup resource, thereby further maximizing system availability during a resource firmware update.

In the illustrated embodiments, updating of a firmware image begins with updating of the firmware image in a flash memory in the logically partitioned data processing system, e.g., in the flash memory of a service processor in the data processing system. During an update, the updated firmware image is copied into a cache memory of a hypervisor to replace a cached version of a prior version of the firmware image. Thereafter, any adjunct partitions that rely on the updated firmware image are terminated, reloaded using the updated firmware image and restarted such that the adjunct partitions execute the updated firmware after the restart.

Furthermore, the restart of adjunct partitions is desirably sequenced to maximize system availability. If multiple self-virtualizing IO resources are affected by a firmware update, the restart of adjunct partitions associated therewith is desirably sequenced so that multiple resources are not rendered unavailable at the same time. Doing so ensures that any logical partitions that rely on primary and backup IO resources with automated failover will be able to automatically failover to a backup resource in the event that a primary resource becomes unavailable during a restart.

In addition, when a physical function adjunct partition includes updated firmware, it is typically desirable to force a restart of each virtual function adjunct partition after a restart of the physical function adjunct partition irrespective of whether firmware for the virtual function adjunct partition has been updated. In contrast, where the firmware of a virtual function adjunct partition is updated without a corresponding update to the firmware of a physical function adjunct partition, restarting of the physical function adjunct partition may not be necessary in some embodiments of the invention.

In addition, in some embodiments, it is desirable to collectively develop, test and verify resource firmware along with the firmware for the physical and/or virtual function adjunct partitions. By doing so, incompatibilities and bugs in the program code that interfaces a self-virtualizing IO resource with a logical partition can be minimized as compared to the implementation of resource firmware separate from that of the adjunct partitions that are used to integrate the resource into the data processing system.

Other variations and modifications will be apparent to one of ordinary skill in the art. Therefore, the invention is not limited to the specific implementations discussed herein.

Hardware and Software Environment

Now turning to the Drawings, wherein like numbers denote like parts throughout the several views, FIG. 1 is a block diagram of a data processing system or computer 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multithreading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
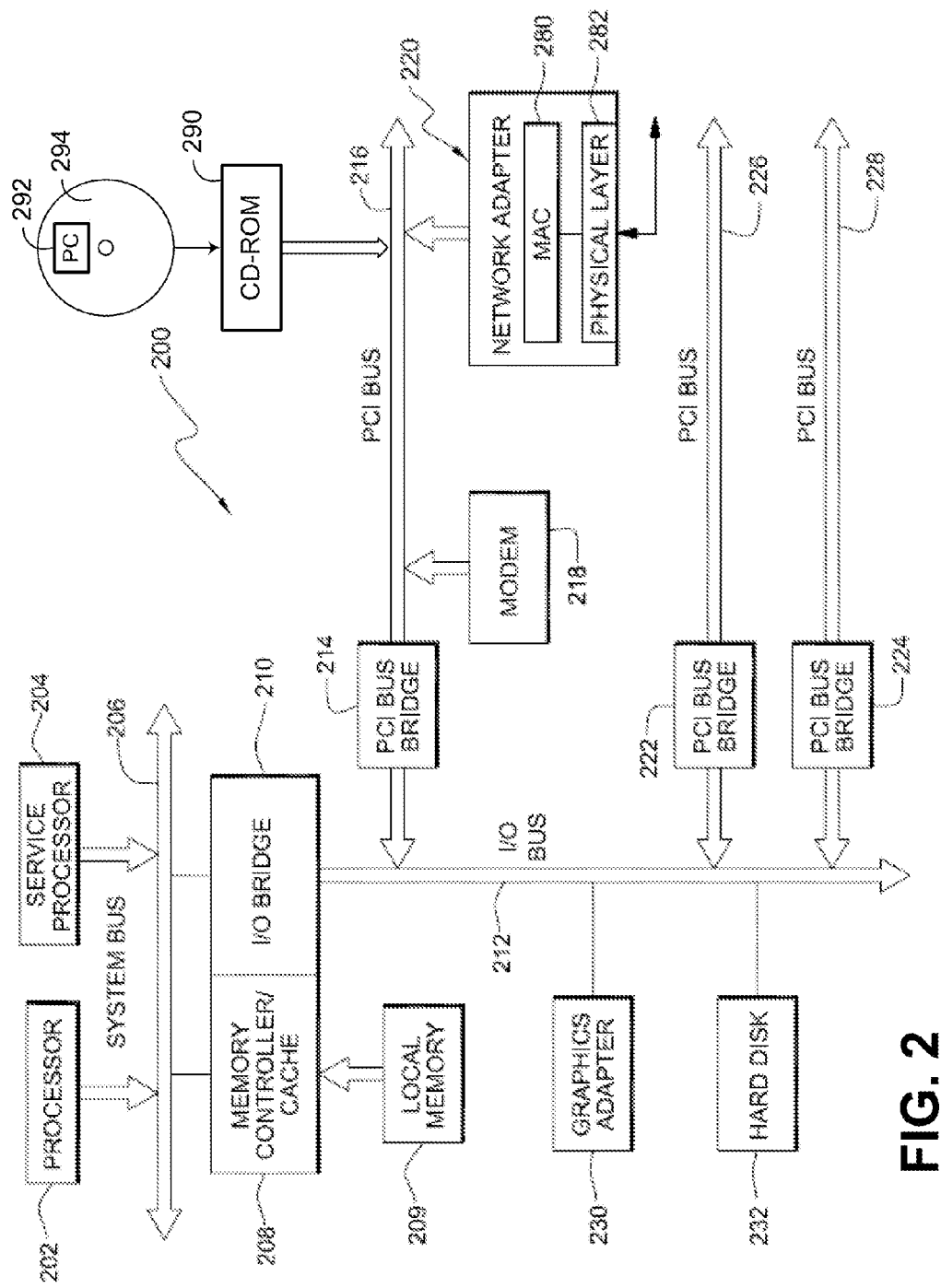
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org (http://www.power-.org/members/developers/specs/PAPR_Version—2.2—09Oct07.pdf).

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
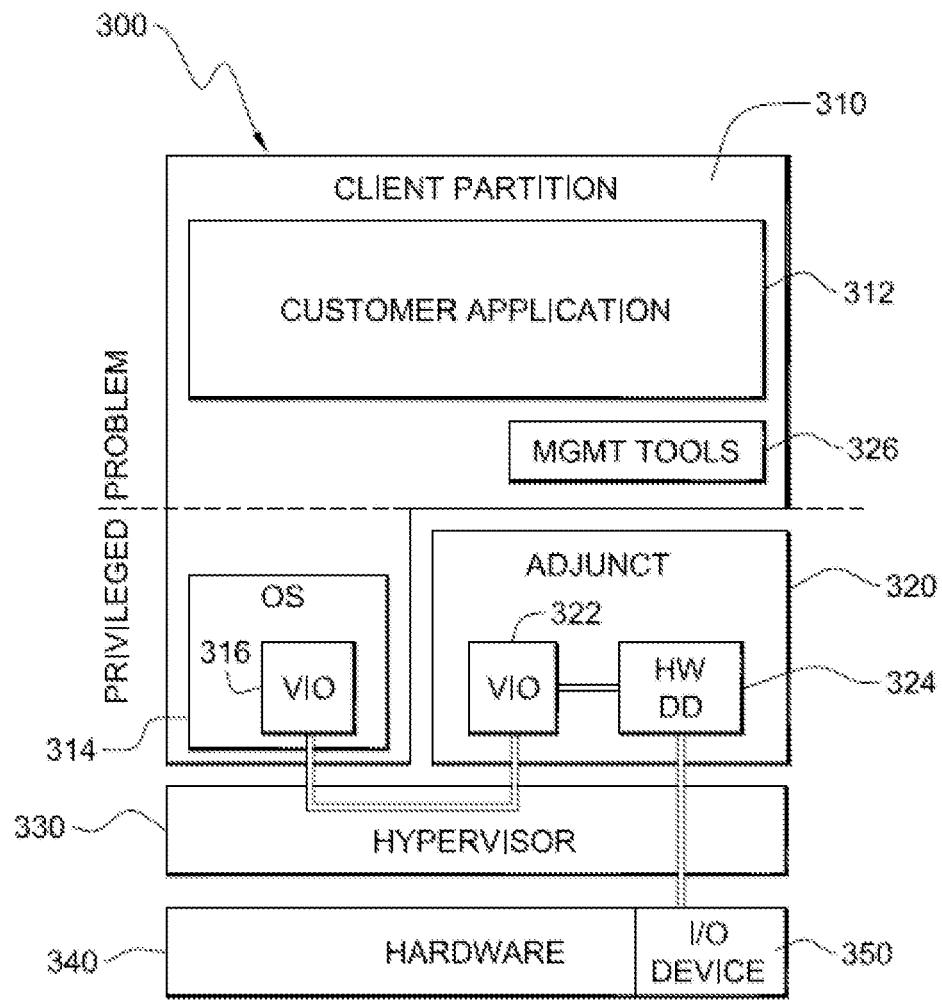
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an Advanced Interactive eXecutive (AIX) device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
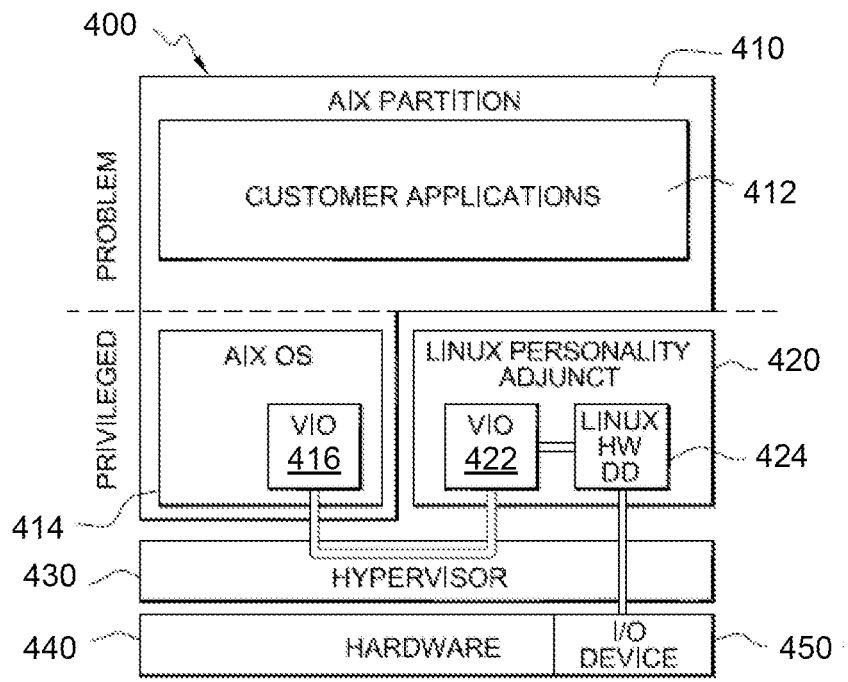
FIG. 4A & 4B illustrate examples of an adjunct partition configuration wherein non-native operating system's device drivers are employed to access or use a physical input/output device, in accordance with an aspect of the present invention.
Figure 4B:
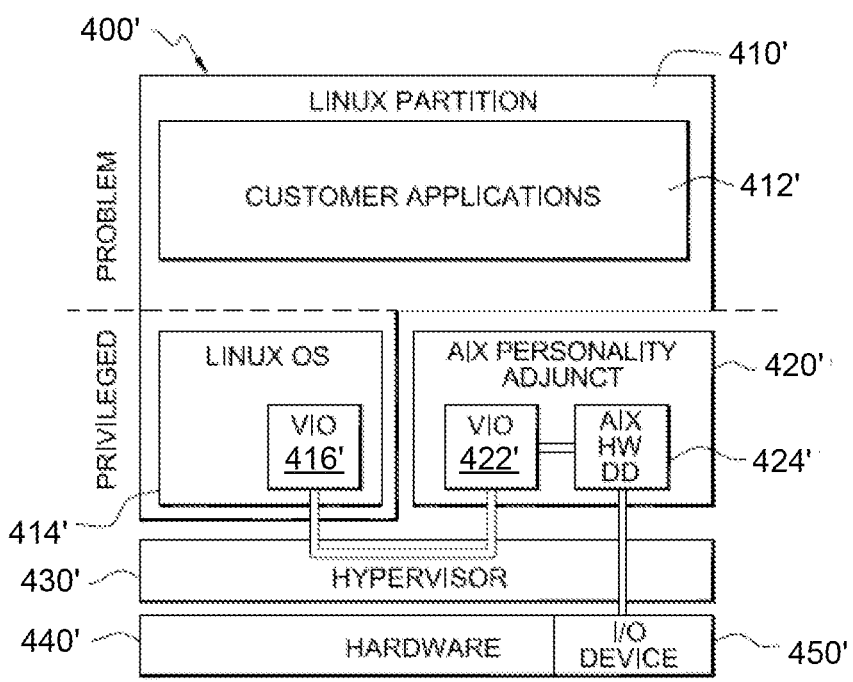

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'.

In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
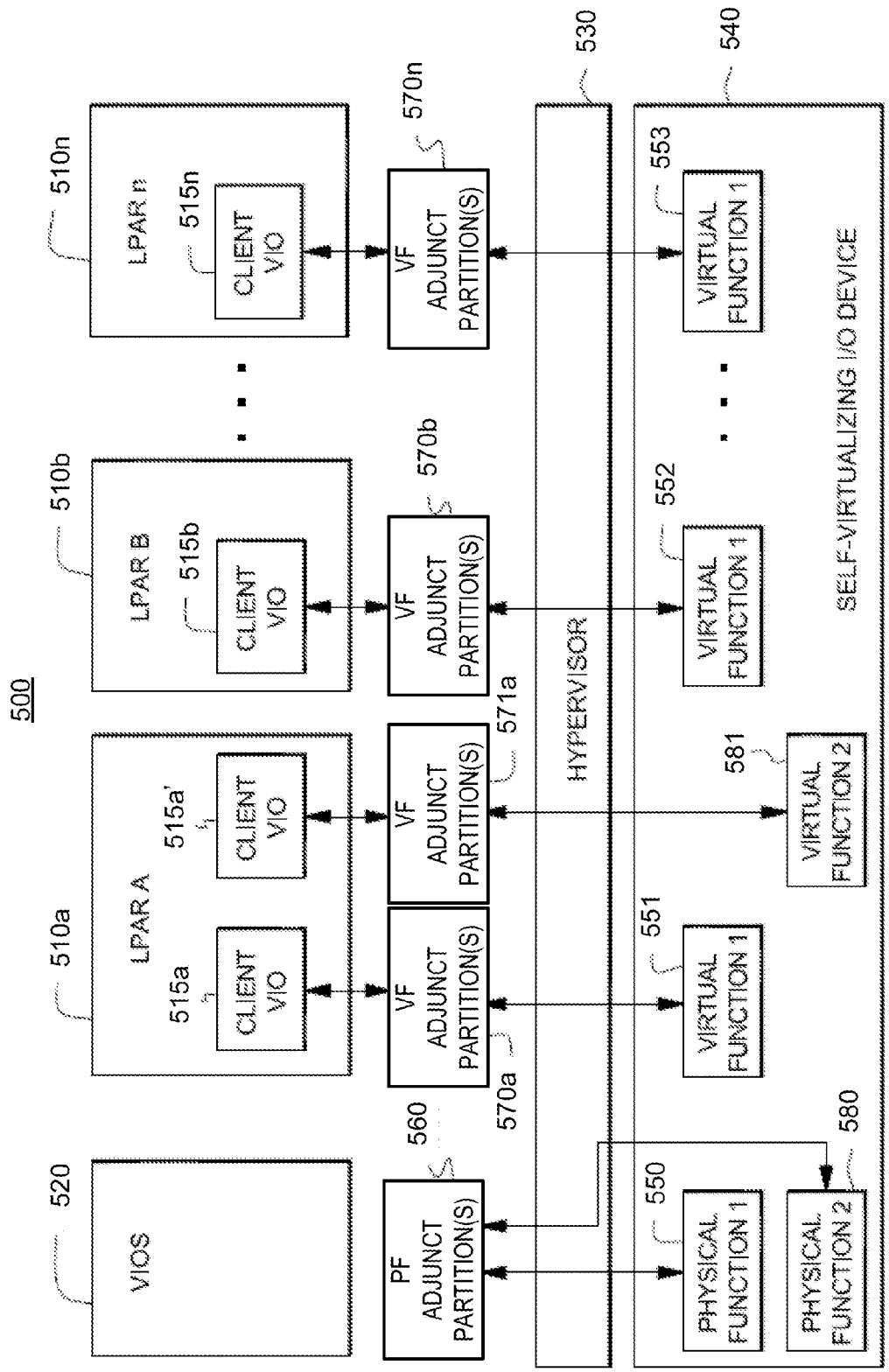
FIG. 5 illustrates one embodiment if a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510a, 510b . . . 510n, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570a, 571a, 570b, 570n are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570a, 570b . . . 570n is the same, while adjunct partition instantiation 571a is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515a, 515a', 515b . . . 515n.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Transparent Update of Self-Virtualizing IO Resource Firmware

Figure 6A:
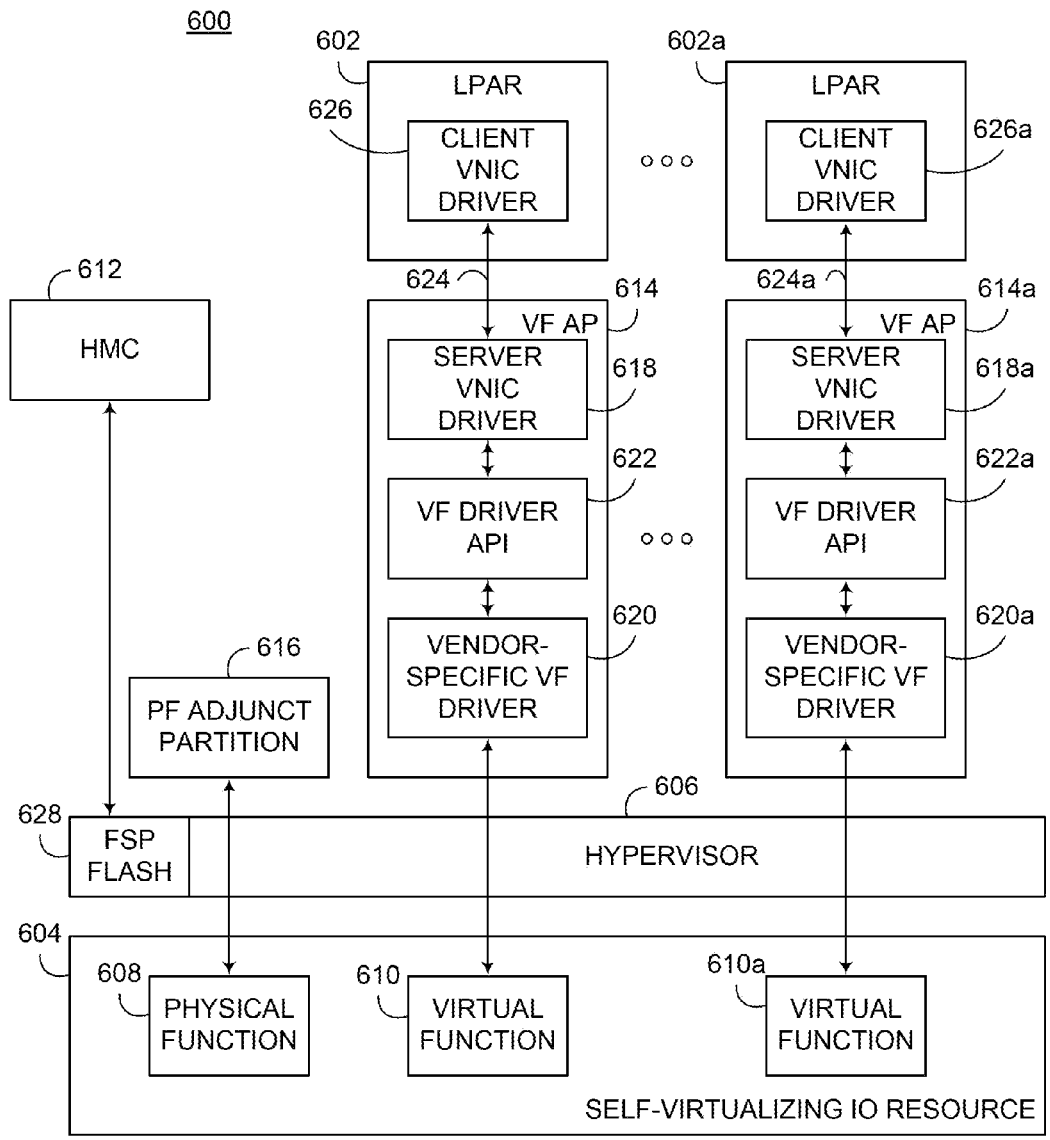
FIGS. 6A-6B illustrate one embodiment of a data processing system within which a resource firmware update process consistent with the invention may be implemented.

Embodiments consistent with the invention implement a firmware update process for a self-virtualizing IO resource such as an SRIOV adapter that is incorporated into a platform firmware update process for a logically partitioned data processing system to enable the resource firmware to be updated in a manner that is for the most part transparent to the logical partitions sharing the adapter. As shown in FIG. 6A, for example, a data processing system 600 may include multiple logical partitions 602, 602a interfacing with a self-virtualizing IO resource 604 through a hypervisor 606. Hypervisor 606 executes on top of other underlying system hardware in addition to self-virtualizing IO resource 604; however, only resource 604 is illustrated to facilitate a better understanding of the invention. The self-virtualizing input/output device 604 is, in one embodiment, an input/output virtualization capable I/O adapter. This adapter may present multiple physical functions, each of which presenting the functionality associated with a non-virtualized I/O adapter, and each with multiple virtual function instances associated therewith, e.g., physical function 608 with associated virtual function instances 610, 610a. A hardware management console (HMC) 612, run above a hypervisor 606, may optionally be used to provide higher-level function than that provided by the hypervisor.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 614, 614a, which are implemented as firmware components for data processing system 600, are referred to as virtual function (VF) adjunct partitions due to the dedicated nature of the adjunct partitions to a particular logical partition to virtual function pairing. For all virtual functions associated with a same underlying hardware device, i.e., physical function 608, the adjunct partition instances instantiated are the same. That is, each adjunct partition instance 614, 614a is the same.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification," and described above in connection with FIG. 5. The physical function would thus contain the SR-IOV capability structure. A virtual function is associated with the physical function, and shares one or more physical resources, such as a link, with the physical function and with other virtual functions that are associated with the same virtual function.

A physical function adjunct partition 616 is employed during initial configuration of the data processing system to facilitate setup of the virtual function adjunct partitions. One, two or more than two physical functions may be implemented within the self-virtualizing input/output device, and each logical partition may access one or more of these physical functions via an associated virtual function of the device.

It the illustrated embodiment, to support access to the self-virtualizing IO resource by the logical partitions, each adjunct partition includes a server device driver 618, 618a, vendor-specific virtual function device driver 620, 620a and virtual function driver API 622, 622a. Server device driver 618, 618a provides a generic, vendor-independent virtual network partition interface 624, 624a with a client device driver 626, 626a in the associated logical partition 602, 602a. The interface is generic and vendor-independent to the extent that the interface does not need to be changed or tailored based upon vendor-specific implementation details of different makes and models of self-virtualizing IO resources. Vendor-specific implementation details are instead handled in the vendor-specific virtual function device driver 620, 620a, which is accessible to the server device driver 618, 618a through a VF driver API 622. API 622, which is optional in some embodiments, further abstracts away implementation details to higher software layers, and further limits the amount of customization required to accommodate new makes and models of self-virtualizing 10 resources. In many instances, VF driver API 622 may require no modifications in order to support new or revised vendor-specific virtual function device drivers 620, 620a.

In the illustrated embodiment, the vendor-independent virtual network partition interface relies on a network protocol, referred to herein as a virtual network interface controller (VNIC) protocol, to facilitate communications between client and server device drivers. The herein-described protocol supports the implementation, within a client logical partition, of a VNIC adapter device driver (VNIC client), which is functionally similar to a physical Ethernet adapter device driver, and is thus usable to interface with a virtual function of a self-virtualizing 10 resource such as an SRIOV network adapter. The VNIC protocol supports sending and receiving Ethernet-compatible packets, adding receive buffers to the virtualized hardware, handling physical and logical link status, acquiring hardware statistics, and utilizing advanced hardware features like checksum offload. The VNIC protocol also provides tracing, logging, and dumping facilities, and the VNIC protocol desirably requires no changes in any layer 3 or higher communication protocol (e.g. TCP, IP, etc.). The VNIC protocol also desirably has reliability, availability and support (RAS) capabilities, and supports the concept of privileges, e.g., to enable a logical partition to set physical port attributes and run diagnostics. It will be appreciated, however, that a vendor-independent virtual network partition interface may be implemented using different protocols, so the invention is not limited to the particular VNIC protocol described herein.

Additional details regarding the vendor-independent virtual network partition interface may be found, for example, in U.S. patent application Ser. No. 12/946,316, filed on Nov. 15, 2010 by Cunningham et al., and entitled "VIRTUALIZATION OF VENDOR SPECIFIC NETWORK INTERFACES OF SELF-VIRTUALIZING INPUT/OUTPUT DEVICE VIRTUAL FUNCTIONS," which is incorporated by reference herein.

Also shown in FIG. 6A is a Functional Service Processor (FSP) flash memory 628, within which is stored resource firmware images, referred to herein as load identifiers (LIDs), which are considered to be the basic unit or binary image that can be loaded into the hypervisor, partition firmware, or adjunct partition. It is within this memory that firmware associated with a self-virtualizing IO resource is maintained and used when instantiating virtual function and physical function adjunct partitions.

Figure 6B:
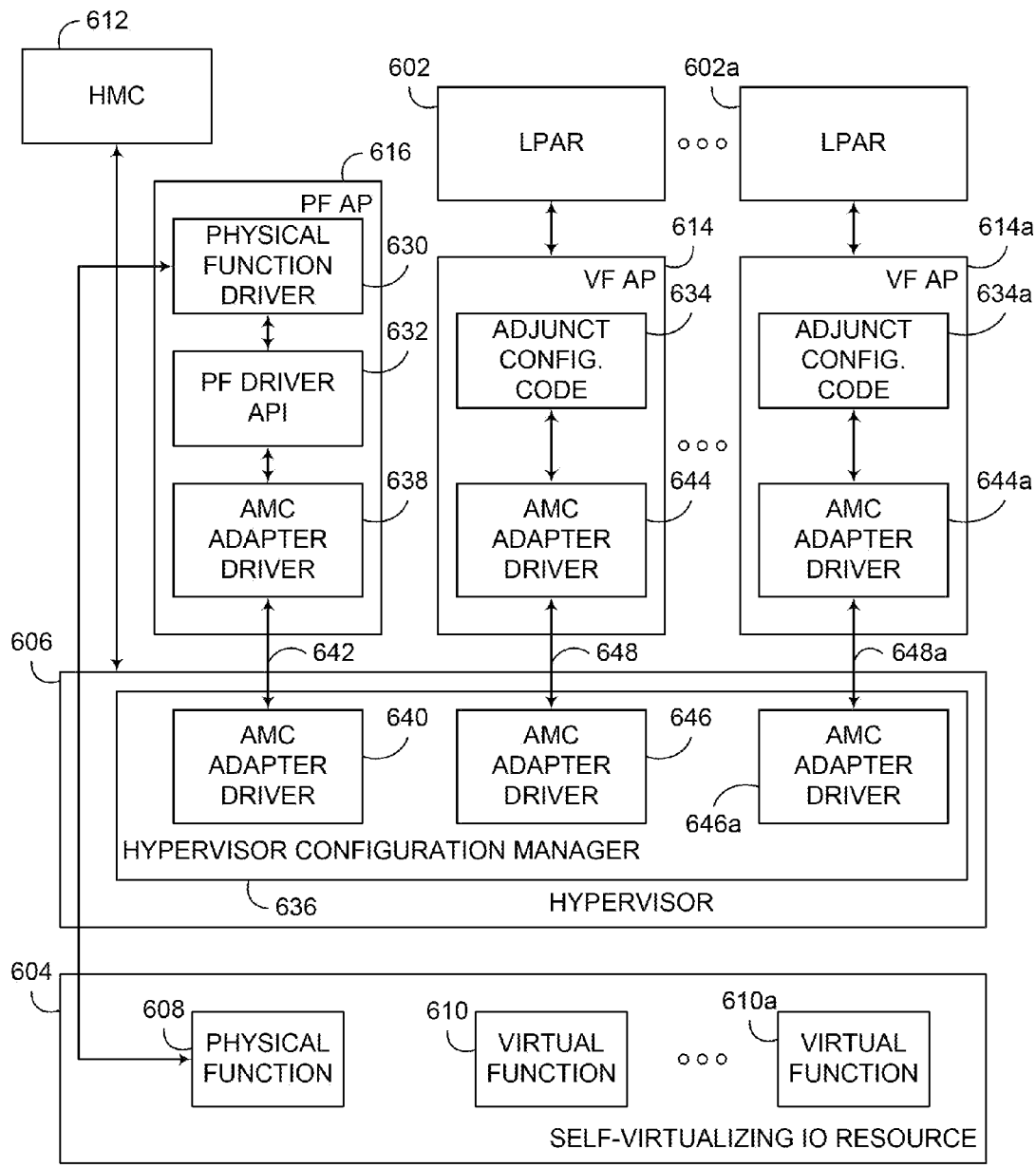

Next, as shown in FIG. 6B, data processing system 600 may also support a vendor independent adjunct management channel (AMC) interface to support the configuration and management of a self-virtualizing IO resource and its associated adjunct partitions. It the illustrated embodiment, physical function adjunct partition 616 includes a physical function device driver 630, which is used to access physical function 608 of resource 604 for the purpose of managing and configuring the resource. An Applications Programming Interface (API) 632 may also be used to abstract vender-specific details of a particular resource 604.

Each virtual function adjunct partition 614, 614a includes adjunct configuration program code 634, 634a, which is used to configure the adjunct partition. Hypervisor (PHYP) 606 includes a configuration manager 636, which is used to coordinate configuration and management of resource 604 and the adjunct partitions 614, 614a, 616 associated therewith. In this regard, an AMC interface is utilized between the configuration manager 624 and the adjunct partitions. The AMC interface is implemented using paired virtual adapters resident respectively in the adjunct partitions and the hypervisor.

For physical function adjunct partition 616, for example, an AMC adapter device driver 638 interfaces with a corresponding AMC adapter device driver 640 resident in hypervisor 606 over an AMC channel 642 Likewise, for virtual function adjunct partitions 614, 614a, AMC adapter device drivers 644, 644a interface with corresponding AMC adapter device drivers 646, 646a resident in hypervisor 606 over AMC channels 648, 648a.

In the illustrated embodiment, the AMC interface relies on a network protocol, referred to herein as an AMC protocol, to facilitate communications between paired AMC adapter device drivers, which is similar in many respects to the virtual network interface control (VNIC) protocol described in the aforementioned '316 application. Additional details regarding the AMC protocol may be found, for example, in U.S. patent application Ser. No. 12/955,698, filed on Nov. 29, 2010 by Barrett et al., and entitled "VIRTUALIZATION OF VENDOR SPECIFIC CONFIGURATION AND MANAGEMENT OF SELF-VIRTUALIZING INPUT/OUTPUT DEVICE," (ROC920100209US1) which is incorporated by reference herein.

The firmware for the self-virtualizing resource and its associated adjunct partitions is maintained in a number of LIDs residing in FSP FLASH memory 628 (FIG. 6A). The hypervisor determines the LIDs to load for the physical function and virtual function adjunct partitions by examination of an adjunct configuration LID, which also resides in FSP FLASH. In addition to identifying adjunct firmware LIDs, the configuration LID also provides memory map layout information that the hypervisor may use to map the adjunct memory pages and MMIO space into a client partition's hardware page table.

In the illustrated embodiment, the resource firmware resides in FSP FLASH in the same fashion as hypervisor firmware, and each adjunct partition image is formed from one of two images, one for a physical function adjunct partition and one for a virtual function adjunct partition. Moreover, each image is made from two LIDs, one of which is unique to both types of adjunct partitions. In addition, each self-virtualizing IO resource has a LID that describes configuration information for the resource. There is also one LID per platform that points to the resource configuration LIDs.

Figure 7:
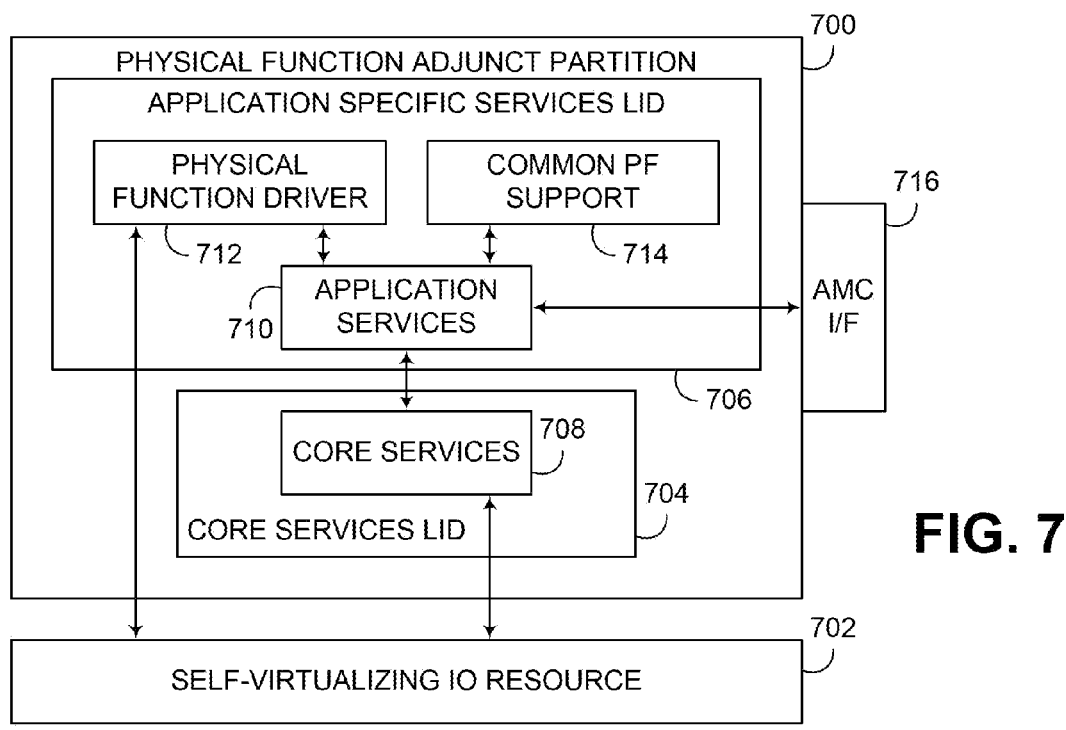
FIG. 7 illustrates an exemplary implementation of the firmware in a physical function adjunct partition in the data processing system of FIGS. 6A-6B.

As shown in FIG. 7, for example, the firmware for a physical function adjunct partition 700 for a self-virtualizing IO resource 702 is provided in a core services LID 704 and an application specific services LID 706. Core services LID 704 is common to both physical function and virtual function adjunct partitions, and supports various core services 708 used by the adjunct partitions, such as heap management, threads, interrupts, locking, timers, TCEs, PCI accesses, trace, EEH, AMC interface, adjunct partition debug and dump functionality.

Application specific services LID 706 supports application specific services 710 such as common AMC command, dump, RAS session control, error log support and CRQ/SubCRQ management. In addition, LID 706 includes the physical function device driver 712 associated with the particular make and model of self-virtualizing IO resource 702 (providing, for example, resource initialization, virtual function and other resource allocation, EEH, firmware update, Ethernet physical port management and internal switches), along with common physical function support module 714, which provides more generic physical function support functionality and is more or less independent of the particular type of self-virtualizing IO resource 702 (e.g., platform configuration management, PCI hot plug support, mobility support, adapter EEH and error information propagation. Therefore, the resource-specific firmware is incorporated into the physical function adjunct partition application specific services LID 706. In addition, it is through application services 710 that communication with the hypervisor over an AMC interface 716 is supported.

Figure 8:
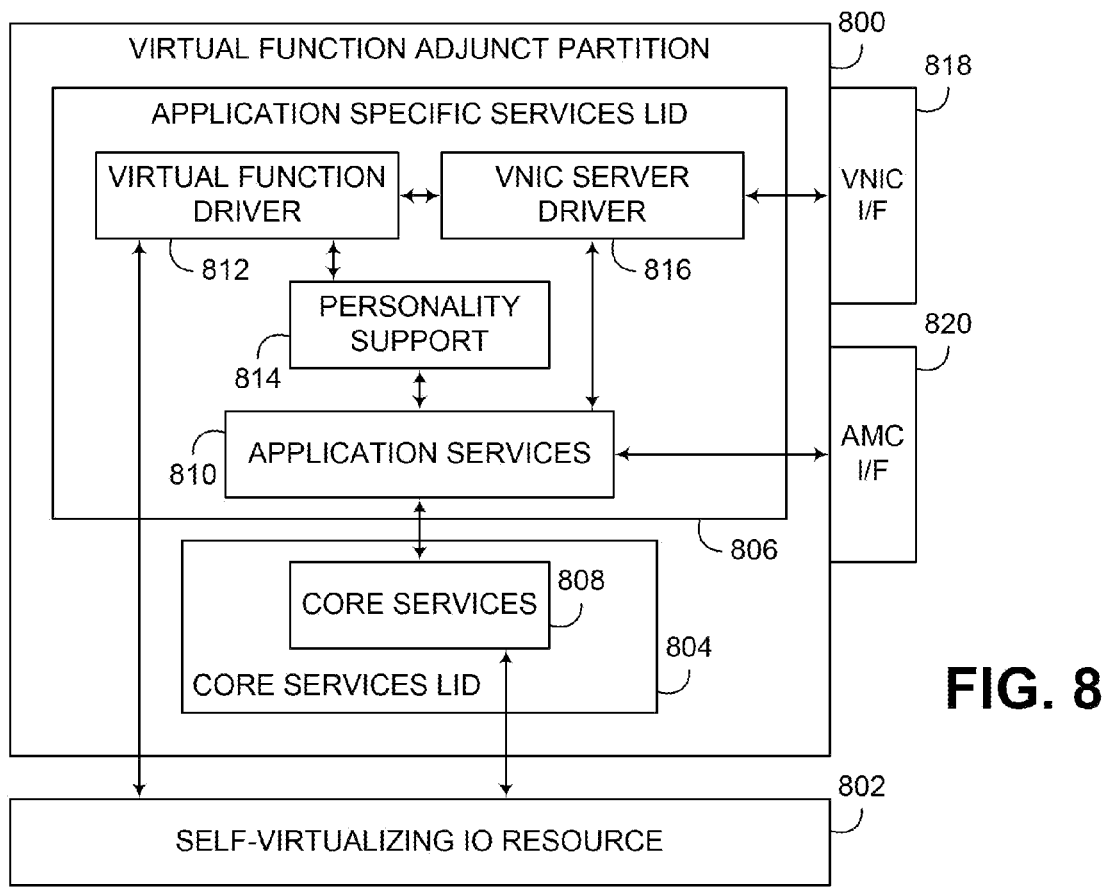
FIG. 8 illustrates an exemplary implementation of the firmware in a virtual function adjunct partition in the data processing system of FIGS. 6A-6B.

As shown in FIG. 8, and similar to physical function adjunct partition 700, the firmware for a virtual function adjunct partition 800 for a self-virtualizing IO resource 802 is provided in a core services LID 804 and an application specific services LID 806. Core services LID 804 as noted above is common to both physical function and virtual function adjunct partitions.

Application specific services LID 806 supports application specific services 810 similar to services 710 of a physical functional adjunct partition. In addition, LID 806 includes the virtual function device driver 812 associated with the particular make and model of self-virtualizing IO resource 802, and optionally including personality support code 814, e.g., to provide AIX support and thereby provide an environment that enables the use of AIX device driver extensions with minimal impact to the device driver kernel extension, and thereby provide suitable interfaces to enable an AIX or other platform-specific device driver to run in the adjunct partition. LID 806 also includes the VNIC server driver 816, which provides communication with an associated logical partition over VNIC interface 818. In addition, it is through application services 810 that communication with the hypervisor over an AMC interface 816 is supported.

In the illustrated embodiment, the physical function adjunct partition firmware, the virtual function adjunct partition firmware, and the resource-specific firmware are developed, tested and verified together for each release of each make and model of self-virtualizing IO resource, e.g., such that the resource and adjunct partition firmware within a LID are collectively tested and verified. In addition, this firmware is system firmware and is considered part of the hypervisor. As noted above, the adjunct partition LIDs are considered platform firmware, reside in the FSP FLASH, and ship with the platform.

In the illustrated embodiment, firmware updates are desirably compatible across all supported OSes, VIOS, and firmware levels. In addition, terminating and restarting an adjunct partition without hardware dependencies is typically a relatively quick process. Hardware dependencies, which may be adapter dependent, may generally dictate how long it will take to terminate, reload, and restart an adjunct partition.

Furthermore, there are interdependencies between the physical and virtual function adjunct partitions for a particular self-virtualizing resource, so it is desirable to keep all virtual function adjuncts for a resource at the same level, and the virtual function version should be consistent with the physical function version. As a result, updating a physical function adjunct partition LID typically requires terminating, reloading, and restarting all physical function adjunct partitions that use the LID. In addition, restarting a physical function adjunct partition requires virtual function adjunct partitions associated with the physical function adjunct partition to be terminated, reloaded, and restarted.

In contrast, a virtual function adjunct partition LID update without a physical function adjunct partition LID update typically requires the virtual function adjunct partitions that use the updated LID to be terminated, reloaded and restarted, but not the associated physical function adjunct partition.

In addition, in the illustrated embodiment, the hypervisor maintains a cache in hypervisor memory of adjunct partition LIDs used to instantiate adjunct partitions for a self-virtualizing IO resource, to prevent a firmware update from causing mismatched levels of adjunct partition LIDs. As such, there should only be one set of active adjunct partition LIDs for a self-virtualizing 10 resource; therefore, all resources on a platform should use the same version of adjunct partition LIDs. Furthermore, in the illustrated embodiment, the resource firmware is included as part of the physical function application specific LID.

Further in the illustrated embodiment, the physical function adjunct partition, virtual function adjunct partition, and resource firmware LIDs are tested as a group to minimize the testing effort. To keep resource firmware consistent with the physical and virtual function adjunct partition firmware, firmware in the physical function adjunct partition checks the level of firmware on the resource, and if the resource firmware is at a level different from the level provided with the physical function adjunct partition, the physical function adjunct partition downloads and activates its resource firmware.

In addition, for a firmware release or service pack with updates to adjunct partition firmware for an installed self-virtualizing IO resource, the typical process is to update (terminate, reload, restart) active adjunct partitions with the new adjunct firmware. Notably, from an OS perspective, this will look like a temporary outage, similar to a network adapter going through EEH recovery.

Concurrent updates of firmware furthermore are tolerant of existing adapter and SRIOV configuration information stored in non-volatile storage. Put another way, new firmware desirably is able to directly use the existing configuration information or convert it to a usable form, without impeding productive use of the resource.

Figure 9:
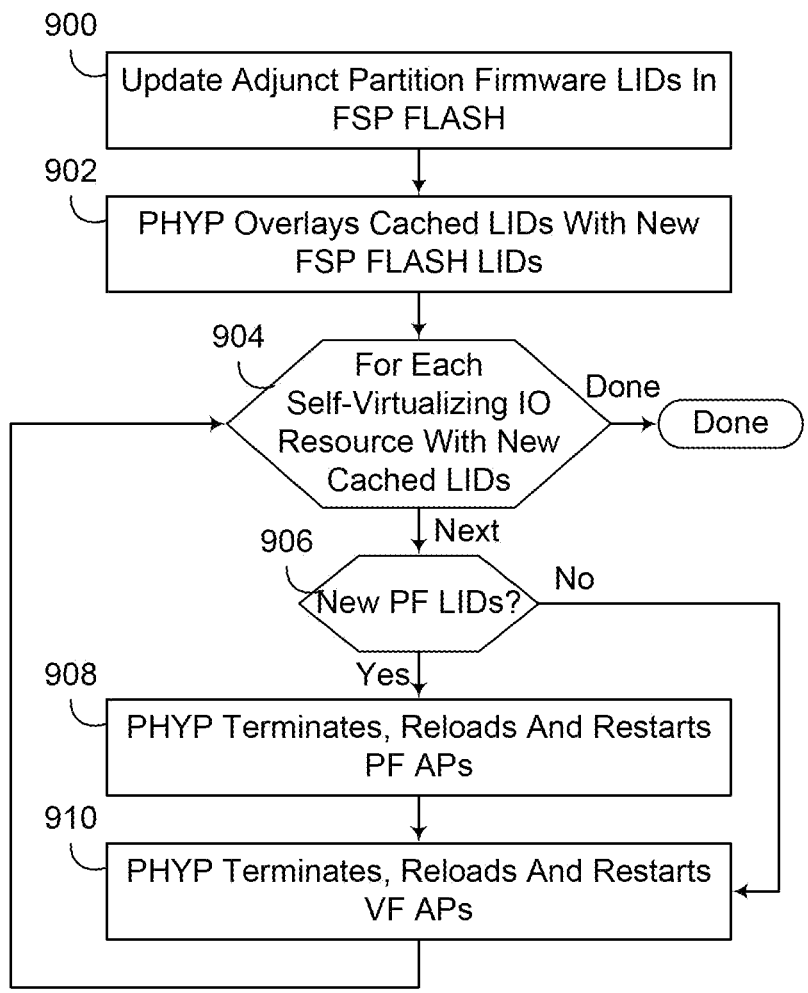
FIG. 9 illustrates an exemplary sequence of operations for updating resource firmware in the data processing system of FIGS. 6A-6B.

FIG. 9 illustrates an exemplary sequence of operations for updating the physical function adjunct partition, virtual function adjunct partition and resource firmware for a hypervisor owned self-virtualizing resource. Such a process may be initiated, for example, by an administrator using HMC GUI or CLI interfaces. First, a new firmware release or service pack updates the adjunct partition firmware LIDs in FSP FLASH (block 900). Next, the hypervisor overlays its cached LIDs with the new FSP FLASH LIDs (block 902). Next, the hypervisor sequences through each self-virtualizing IO resource with new cached LIDs (block 904) by first determining for each such resource whether new LIDs are present for the physical function adjunct partition (block 906). If so, the hypervisor terminates, reloads, and restarts the physical function adjunct partitions (block 908). In addition, restarting of the physical function adjunct partitions results in each of the virtual function adjunct partitions being similarly terminated, reloaded and restarted (block 910). If, however, the new LIDs are only for the virtual function adjunct partition then restarting of the physical function adjunct partitions is bypassed, and only the virtual function adjunct partitions are terminated, reloaded and restarted (block 910). Control then returns to block 904 to process additional resources with new cached LIDs, and once all such resources have been processed, updating of the firmware is complete.

The aforementioned update process is therefore performed without the self-virtualizing resource being taken offline, and from the perspective of the logical partitions, the temporary unavailability of the self-virtualizing IO resource while the firmware is being updated is presented as a loss of connection on the VNIC interface. As such, the VNIC client device driver 626, 626*a* (FIG. 6A) will detect the loss of connection, and handle any loss of inflight data and prepare for reconnection in a manner similar to a conventional network interface. Then, when the virtual function adjunct partition comes back online, the server VNIC device driver 618, 618*a* (FIG. 6A) reestablishes the connection with the VNIC client device driver and network communications are permitted to resume.

In addition, in some embodiments, logical partitions may rely upon multiple network connections and adapters, so that an outage detected on a primary network connection during a firmware update results in an automatic failover to a backup network connection, and as a result, network communications for the logical partition can resume in parallel with the update to the adjunct partition and resource firmware.

It will be appreciated that the implementation of the aforementioned firmware update process in a logically partitioned data processing system would be within the abilities of one of ordinary skill in the art having the benefit of the instant disclosure.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of updating firmware associated with a self-virtualizing input/output (IO) resource in a logically partitioned data processing system, the method comprising:
    updating at least one firmware image that includes updated resource firmware associated with the self-virtualizing IO resource and adjunct partition firmware associated with an adjunct partition for the self-virtualizing IO resource; and
    during a restart of the adjunct partition in which the adjunct partition executes the updated firmware image, maintaining a logical partition that uses the self-virtualizing IO resource in an active state and without deconfiguring the self-virtualizing IO resource from the logical partition.

2. The method of claim 1, wherein maintaining the logical partition that uses the self-virtualizing IO resource in the active state and without deconfiguring the self-virtualizing IO resource from the logical partition including presenting the self-virtualizing IO resource as experiencing a temporary outage during restarting of the adjunct partition.

3. The method of claim 2, wherein presenting the self-virtualizing IO resource as experiencing a temporary outage during restarting of the adjunct partition includes presenting the self-virtualizing IO resource as having lost network connectivity during restarting of the adjunct partition and as having network connectivity restored after restarting of the adjunct partition is complete.

4. The method of claim 2, wherein the logical partition is interfaced to the self-virtualizing IO resource using a vendor-independent client virtual network partition interface device driver resident in the logical partition, and wherein presenting the self-virtualizing IO resource as experiencing a temporary outage during restarting of the adjunct partition includes presenting the self-virtualizing IO resource as experiencing a temporary outage using the vendor-independent client virtual network partition interface device driver and without deconfiguring the vendor-independent client virtual network partition interface device driver in the logical partition.

5. The method of claim 4, wherein the adjunct partition comprises a virtual function adjunct partition that includes a vender-independent server virtual network partition interface device driver configured to interface with the logical partition over the vendor-independent virtual network partition interface and a resource-specific device driver configured to interface with the self-virtualizing IO resource.

6. The method of claim 4, further comprising, in the logical partition, automatically failing over to a backup IO resource in response to detecting the temporary outage of the self-virtualizing IO resource.

7. The method of claim 1, wherein the adjunct partition comprises a virtual function adjunct partition, and wherein the firmware image includes resource firmware associated with a virtual function of the self-virtualizing IO resource and the adjunct partition firmware includes virtual function adjunct partition firmware associated with the virtual function adjunct partition.

8. The method of claim 7, wherein the resource firmware comprises a virtual function device driver for the self-virtualizing IO resource, and wherein the virtual function adjunct partition firmware comprises application specific services, personality support and a vendor-independent server virtual network partition interface device driver.

9. The method of claim 1, wherein the adjunct partition comprises a physical function adjunct partition, and wherein the firmware image includes resource firmware associated with a physical function of the self-virtualizing IO resource and the adjunct partition firmware includes physical function adjunct partition firmware associated with the physical function adjunct partition.

10. The method of claim 9, wherein the resource firmware comprises a physical function device driver for the self-virtualizing IO resource, and wherein the physical function adjunct partition firmware comprises application specific services and common physical function support.

11. The method of claim 1, wherein the firmware image comprises an application specific services image, and wherein updating the at least one firmware image further includes updating a core services image associated with the adjunct partition.

12. The method of claim 1, wherein updating the at least one firmware image comprises:
    updating at least one firmware image in a flash memory in the logically partitioned data processing system with the updated firmware image; and
    replacing a cached firmware image in a hypervisor of the logically partitioned data processing system with a copy of the updated firmware image by copying the updated firmware image from the flash memory and caching the updated firmware image in the hypervisor.

13. The method of claim 12, wherein restarting the adjunct partition comprises, in the hypervisor:
    terminating the adjunct partition;
    reloading the adjunct partition after replacing the cached firmware image in the hypervisor; and
    restarting the adjunct partition after reloading the adjunct partition such that the adjunct partition executes the copy of the updated firmware image cached in the hypervisor.

14. The method of claim 1, wherein the adjunct partition comprises a virtual function adjunct partition, and wherein restarting the adjunct partition is performed without restarting a physical function adjunct partition associated with the self-virtualizing IO resource for which no firmware has been updated.

15. The method of claim 1, wherein the adjunct partition comprises a physical function adjunct partition, and wherein restarting the adjunct partition includes restarting each virtual function adjunct partition associated with the self-virtualizing IO resource in response to restarting the physical function adjunct partition.

16. The method of claim 1, wherein the adjunct partition comprises a physical function adjunct partition, wherein the firmware image comprises a physical function adjunct partition firmware image, and wherein the method further comprises:
    updating a virtual function adjunct partition firmware image that includes updated resource firmware associated with the self-virtualizing IO resource and virtual function adjunct partition firmware associated with the virtual function adjunct partition for the self-virtualizing IO resource;

restarting the virtual function adjunct partition after restarting the physical function adjunct partition such that the virtual function adjunct partition executes the updated virtual function adjunct partition firmware image; and during restarting of the physical function and virtual function adjunct partitions, maintaining the logical partition in the active state by presenting the self-virtualizing IO resource as experiencing a temporary loss of network connectivity using a vendor-independent client virtual network partition interface device driver resident in the logical partition and interfaced with the virtual function adjunct partition through a vendor-independent virtual network partition interface.

17. The method of claim 1, wherein the self-virtualizing IO resource comprises a first self-virtualizing IO resource, the method further comprising sequencing restarts of the adjunct partition for the first self-virtualizing IO resource and an adjunct partition for a second self-virtualizing IO resource for which a firmware image therefor has been updated such that availability of at least one of the first and second self-virtualizing IO resources is maintained throughout a firmware update process.

18. The method of claim 1, further comprising collectively testing and verifying the updated resource firmware and the adjunct partition firmware in the firmware image.

19. The method of claim 1, wherein the adjunct partition includes a separate dispatchable state and employs a virtual address space donated from the logical partition or a hypervisor of the data processing system.

20. The method of claim 1, wherein the self-virtualizing IO resource comprises an single root input/output virtualization (SRIOV) Ethernet adapter.

21. An apparatus, comprising:
at least one processor, wherein the at least one processor comprises at least one physical hardware device; and
program code configured upon execution by the at least one processor to update firmware associated with a self-virtualizing input/output (IO) resource in a logically partitioned data processing system by updating at least one firmware image that includes updated resource firmware associated with the self-virtualizing IO resource and adjunct partition firmware associated with an adjunct partition for the self-virtualizing IO resource, and during a restart of the adjunct partition in which the adjunct partition executes the updated firmware image, maintaining a logical partition that uses the self-virtualizing IO resource in an active state and without deconfiguring the self-virtualizing IO resource from the logical partition during restarting of the adjunct partition.

22. The apparatus of claim 21, wherein the logical partition is interfaced to the self-virtualizing IO resource using a vendor-independent client virtual network partition interface device driver resident in the logical partition, wherein the program code is configured to maintain the logical partition that uses the self-virtualizing IO resource in the active state and without deconfiguring the self-virtualizing IO resource from the logical partition by presenting the self-virtualizing IO resource as experiencing a temporary outage during restarting of the adjunct partition using the vendor-independent client virtual network partition interface device driver and without deconfiguring the vendor-independent client virtual network partition interface device driver in the logical partition.

23. The apparatus of claim 21, wherein the program code is configured to update the at least one firmware image by updating at least one firmware image in a flash memory in the logically partitioned data processing system with the updated firmware image, and replacing a cached firmware image in a hypervisor of the logically partitioned data processing system with a copy of the updated firmware image by copying the updated firmware image from the flash memory and caching the updated firmware image in the hypervisor, and wherein the program code is configured to restart the adjunct partition by, in the hypervisor, terminating the adjunct partition, reloading the adjunct partition after replacing the cached firmware image in the hypervisor, and restarting the adjunct partition after reloading the adjunct partition such that the adjunct partition executes the copy of the updated firmware image cached in the hypervisor.

24. The apparatus of claim 21, wherein the adjunct partition comprises a physical function adjunct partition, wherein the firmware image comprises a physical function adjunct partition firmware image, and wherein the program code is further configured to:
update a virtual function adjunct partition firmware image that includes updated resource firmware associated with the self-virtualizing IO resource and virtual function adjunct partition firmware associated with the virtual function adjunct partition for the self-virtualizing IO resource;
restart the virtual function adjunct partition after restarting the physical function adjunct partition such that the virtual function adjunct partition executes the updated virtual function adjunct partition firmware image; and
during restarting of the physical function and virtual function adjunct partitions, maintain the logical partition in the active state by presenting the self-virtualizing IO resource as experiencing a temporary loss of network connectivity using a vendor-independent client virtual network partition interface device driver resident in the logical partition and interfaced with the virtual function adjunct partition through a vendor-independent virtual network partition interface.

25. A program product, comprising:
a non-transitory computer readable medium; and
program code stored on the non-transitory computer readable medium and configured upon execution to update firmware associated with a self-virtualizing input/output (IO) resource in a logically partitioned data processing system by updating at least one firmware image that includes updated resource firmware associated with the self-virtualizing IO resource and adjunct partition firmware associated with an adjunct partition for the self-virtualizing IO resource, and during a restart of the adjunct partition in which the adjunct partition executes the updated firmware image, maintaining a logical partition that uses the self-virtualizing IO resource in an active state and without deconfiguring the self-virtualizing IO resource from the logical partition during restarting of the adjunct partition.

* * * * *